(12) United States Patent
Yoda

(10) Patent No.: US 9,742,944 B2
(45) Date of Patent: Aug. 22, 2017

(54) IMAGE FORMING APPARATUS USING RECORDING SHEET FOLDED IN HALF

(71) Applicant: KYOCERA Document Solutions Inc., Osaka-shi, Osaka (JP)

(72) Inventor: Junya Yoda, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 14/952,766

(22) Filed: Nov. 25, 2015

(65) Prior Publication Data

US 2016/0156794 A1 Jun. 2, 2016

(30) Foreign Application Priority Data

Nov. 28, 2014 (JP) ................................. 2014-241833

(51) Int. Cl.
*H04N 1/00* (2006.01)
(52) U.S. Cl.
CPC ..... *H04N 1/00572* (2013.01); *H04N 1/00652* (2013.01); *H04N 2201/0081* (2013.01); *H04N 2201/0094* (2013.01)
(58) Field of Classification Search
None
See application file for complete search history.

(56) References Cited

U.S. PATENT DOCUMENTS

| | | | |
|---|---|---|---|
| 5,708,513 A | 1/1998 | Hasuo et al. | |
| 8,970,895 B2* | 3/2015 | Muramoto | G06K 15/1868 358/1.18 |
| 2005/0281569 A1* | 12/2005 | Nishimura | G03G 15/1675 399/31 |
| 2011/0188095 A1* | 8/2011 | Shiraishi | H04N 1/04 358/474 |
| 2011/0194127 A1* | 8/2011 | Nagakoshi | H04N 1/0044 358/1.9 |
| 2013/0342874 A1* | 12/2013 | Muramoto | G06K 15/1868 358/1.18 |
| 2014/0377450 A1* | 12/2014 | Knorr | G01B 17/025 427/9 |
| 2016/0060056 A1* | 3/2016 | Yoshimura | B65H 7/06 271/3.18 |

FOREIGN PATENT DOCUMENTS

| | | | |
|---|---|---|---|
| JP | 07283933 | A | 10/1995 |
| JP | H11327364 | A | 11/1999 |
| JP | 2003046754 | A | 2/2003 |
| JP | 2013222010 | A | 10/2013 |

\* cited by examiner

*Primary Examiner* — Peter K Huntsinger
(74) *Attorney, Agent, or Firm* — Alleman Hall Creasman & Tuttle LLP

(57) ABSTRACT

An image forming apparatus includes a double-sided image forming portion capable of forming an image on each of first and second recording surfaces of a recording sheet, a double-sided image reading portion configured to acquire a pair of divided images each constituting a half of an original image, and an image forming control portion configured to supply a folded recording sheet folded in half to the double-sided image forming portion, and cause the double-sided image forming portion to perform processing of forming the pair of divided images on the first and second recording surfaces, respectively, of the folded recording sheet.

7 Claims, 9 Drawing Sheets

IMAGE FORMING APPARATUS USING RECORDING SHEET FOLDED IN HALF

INCORPORATION BY REFERENCE

This application is based upon and claims the benefit of priority from the corresponding Japanese Patent Application No. 2014-241833 filed on Nov. 28, 2014, the entire contents of which are incorporated herein by reference.

BACKGROUND

The present disclosure relates to an image forming apparatus and an image forming method capable of forming an image on a recording sheet folded in half.

There is known an image reading apparatus for obtaining an image of a document having a size exceeding the maximum readable size of a document. Such an image reading apparatus reads images of both sides of a document folded in half, and combines the read two images.

SUMMARY

An image forming apparatus according to an aspect of the present disclosure includes a recording sheet supply portion, a double-sided image forming portion, a divided image acquiring portion, and an image forming control portion. The recording sheet supply portion feeds a recording sheet. The double-sided image forming portion is capable of forming an image on each of a first recording surface of the recording sheet and a second recording surface opposite the first recording surface while conveying the recording sheet supplied from the recording sheet supply portion. The divided image acquiring portion acquires a pair of divided images each constituting a half of an original image. The image forming control portion supplies a folded recording sheet that is the recording sheet folded in half to the double-sided image forming portion, and causes the double-sided image forming portion to perform processing of forming the pair of divided images on the first recording surface and the second recording surface, respectively, of the folded recording sheet.

An image forming method according to another aspect of the present disclosure includes supplying, to a double-sided image forming portion capable of forming an image on each of a first recording surface of a recording sheet and a second recording surface opposite the first recording surface while conveying the recording sheet, a folded recording sheet that is the recording sheet folded in half. The image forming method further includes acquiring a pair of divided images each constituting a half of an original image. The image forming method further includes causing the double-sided image forming portion to perform processing of forming the pair of divided images on the first recording surface and the second recording surface, respectively, of the folded recording sheet.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

First Embodiment

Hereinafter, an embodiment of the present disclosure will be described with reference to the drawings. Note that the embodiment described below is merely an example of embodiments of the present disclosure, and the embodiment of the present disclosure may be modified as appropriate without departing from the gist of the present disclosure.

Figure 1:
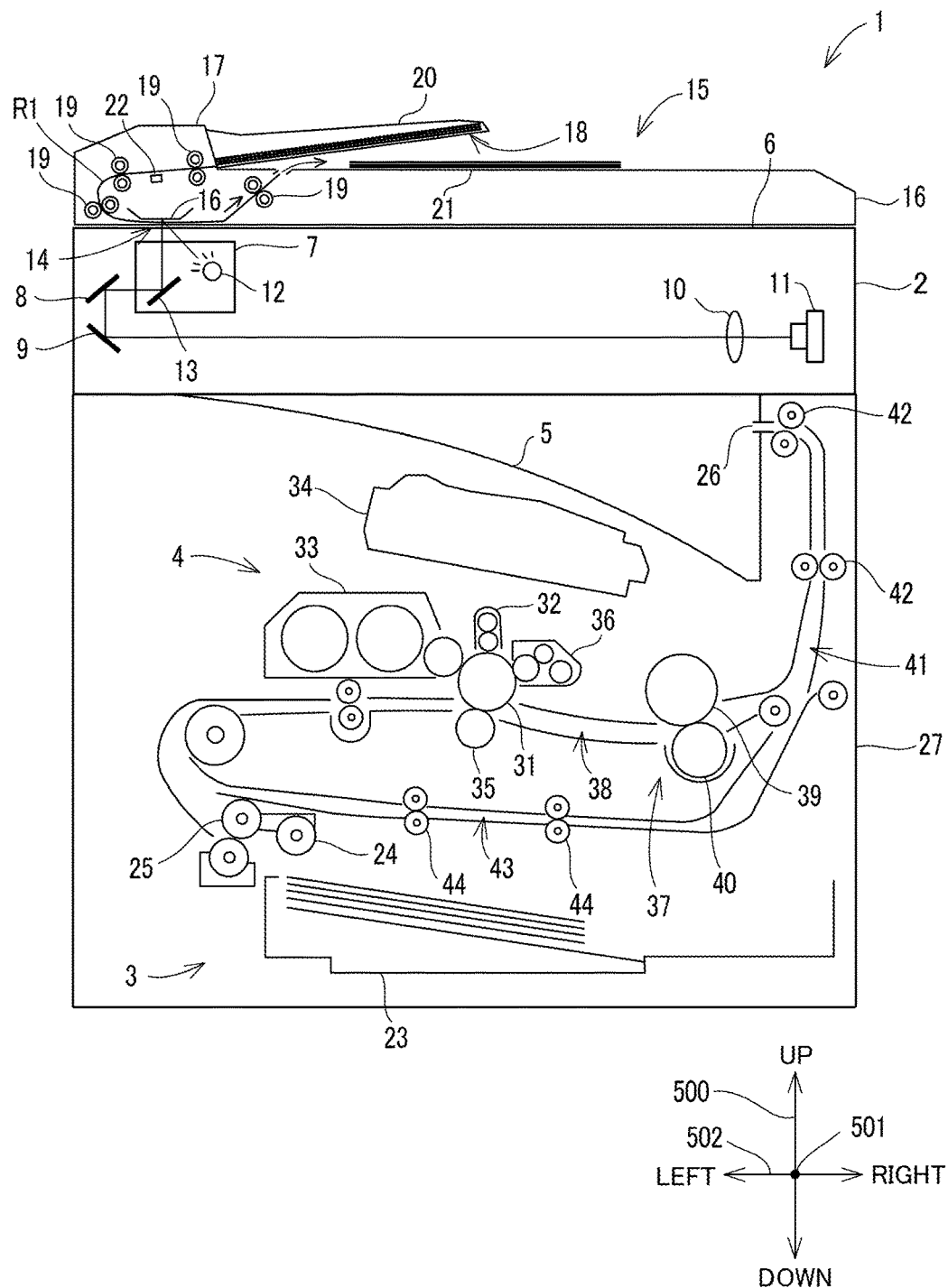
FIG. 1 is a diagram showing an internal configuration of an image forming apparatus according to a first embodiment of the present disclosure.

In the following description, an up-down direction 500 is defined with reference to the state in which an image forming apparatus 1 is placed so as to be usable (state in FIG. 1), a front-rear direction 501 is defined such that the near side (front side) is on the front, and a left-right direction 502 is defined with the image forming apparatus 1 viewed from the near side (front side).

The image forming apparatus 1 is a multifunction peripheral having various functions such as those of a printer and a facsimile. The image forming apparatus 1 forms an image of a document on a recording sheet made of, for example, plant fiber such as pulp, by using developer such as toner.

Note that the image forming apparatus 1 is not limited to a multifunction peripheral, and may be, for example, a printer, a facsimile apparatus, a copier, or the like.

The image forming apparatus 1 includes a double-sided image reading portion 2, a sheet feed portion 3, a double-sided image forming portion 4, and a sheet discharge portion 5.

Figure 4A:
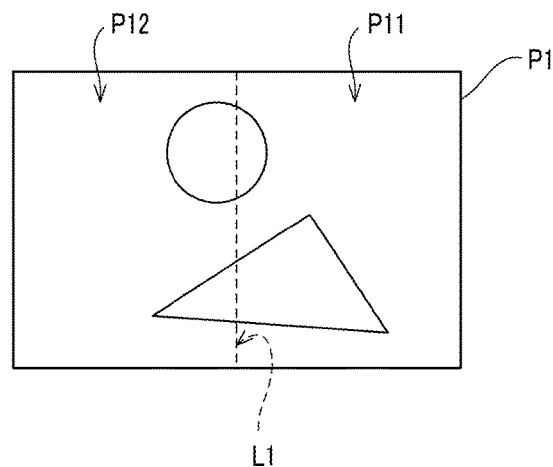
FIG. 4A is a diagram showing a state before a document is folded.
Figure 4B:
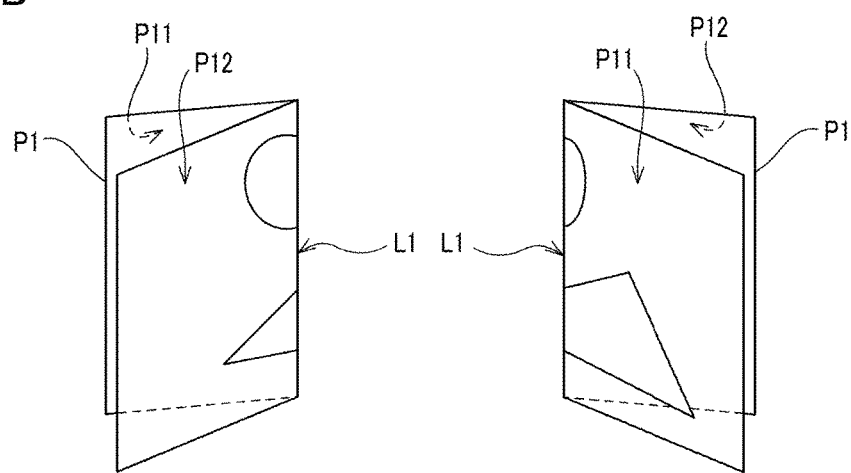
FIG. 4B is a diagram showing a state in which the document is folded.
Figure 4C:
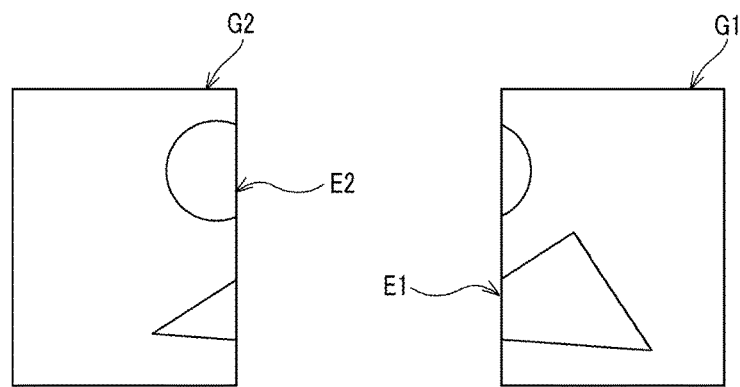
FIG. 4C is a diagram showing a pair of divided images read from a first document surface and a second document surface of the folded document.

The double-sided image reading portion 2 performs image reading processing of reading an image from a document P1 (see FIG. 4). The double-sided image reading portion 2 includes a contact glass 6, a reading unit 7, mirrors 8 and 9, an optical lens 10, an image pickup element 11, and so forth. The image pickup element 11 may be a CCD (Charge Coupled Devise) sensor, for example. The double-sided image reading portion 2 corresponds to an original image acquiring portion.

The contact glass 6 is provided on an upper surface of the double-sided image reading portion 2. When an ADF (Auto Document Feeder) 17, which will be described later, is not used, the document P1 for which an image is to be read by the image forming apparatus 1 is placed on the contact glass 6.

The reading unit 7 includes a light source 12 and a mirror 13. The light source 12 may be an LED (Light Emitting Diode), for example. The reading unit 7 can be moved in the left-right direction 502 in FIG. 1 by a movement mechanism (not shown) using a drive motor. For example, the drive motor may be a stepping motor or the like. When the reading unit 7 is moved in the left-right direction 502, the light emitted from the light source 12 toward the contact glass 6 is scanned in the left-right direction 502.

When the ADF 17, which will be described later, is used, light is emitted from the light source 12 to a reading position 14. Then, the reflection light reflected by the document P1 passing through the reading position 14 is guided by the mirrors 13, 8, and 9 to the optical lens 10. The light that has been guided to the optical lens 10 is collected by the optical lens 10, and subsequently enters the image pickup element 11.

The image pickup element 11 is a photoelectric conversion element that converts the received light into an electric signal (voltage) according to the amount (intensity of brightness) of the light, and outputs the signal to an image processing portion (not shown).

A document cover 16 is opened and closed between a closed position and an open position, with a pivot shaft (not shown) provided on the rear side of the double-sided image reading portion 2 as a pivot fulcrum. The closed position is a position in which the document cover 16 covers the upper surface of the contact glass 6 in close contact therewith, and the open position is a position in which the document cover 16 is spaced upwardly from the upper surface of the contact glass 6.

A portion that is uniformly colored in white or another light color is provided on the surface of the document cover 16 that opposes the contact glass 6. The document cover 16 is formed in a size that can cover the entire region of the contact glass 6.

The document cover 16 is provided with an ADF 17. The ADF 17 includes a document placement portion 18, a plurality of conveyance roller pairs 19, a document guide 20, a sheet discharge portion 21, and so forth.

The ADF 17 includes a document conveyance path R1 that is formed in a U-shape extending from the document placement portion 18 to the sheet discharge portion 21. A plurality of the conveyance roller pairs 19 are provided along the document conveyance path R1. The ADF 17 conveys the document P1 by driving each of the conveyance roller pairs 19 by a motor (not shown). The ADF 17 feeds the document P1 placed on the document placement portion 18, and conveys the document P1 through the reading position 14 on the document conveyance path R1 to the sheet discharge portion 21. The reading position 14 is a predetermined position on the document conveyance path R1. The ADF 17 is an example of a document supply portion.

The document guide 20 forms a path for the document P1 above the reading position 14 on the contact glass 6, and guides the document P1.

The double-sided image reading portion 2 includes an image pickup element 22 disposed at a position on the document conveyance path R1. The image pickup element 22 reads an image of the document P1 at a position different from the reading position 14. In the present embodiment, the reading position of the image pickup element 22 is a position located on the upstream side in the conveyance direction of the document P1 with respect to the reading position 14 on the document conveyance path R1. The image pickup element 22 reads an image of a surface of the document P1 conveyed along the document conveyance path R1 by the conveyance roller pairs 19, the surface being opposite the surface read by the image pickup element 11.

The image pickup element 22 may be a CIS (Contact Image Sensor) 22. A CIS is a contact-type image sensor having a focal length shorter than that of a CCD. The CIS includes a contact glass, a light source, a lens, a line sensor, a unit casing that houses these members, and so forth. The detailed description of the CIS has been omitted.

When an image of one side of a single sheet of the document P1 is to be read, the document P1 is placed on the contact glass 6 by the user, and subsequently, the document cover 16 is brought into the closed position. Then, the user performs an operation to start image reading on an operation display portion 50 (see FIG. 2), which will be described later.

When the operation to start image reading is performed, the reading unit 7 moves to the right in the left-right direction 502, and concurrently, the light source 12 emits light to the document P1. Consequently, the light reflected from the document P1 is guided through the mirrors 8 and 9 and the optical lens 10 to the image pickup element 11. Furthermore, light quantity data corresponding to the amount of the light received by the image pickup element 11 is successively outputted to the image processing portion (not shown). The image processing portion receives light quantity distribution data containing the light quantity distribution corresponding to the density of the image of the document P1.

The image processing portion obtains the light quantity distribution data representing the light quantity distribution of the entire region of the document P1 to which light has been emitted. Furthermore, the image processing portion performs image processing on the obtained light quantity distribution data, thereby generating image data of the document P1 from the light quantity distribution data.

Image reading of the document P1 by the double-sided image reading portion 2 is performed using the ADF 17. At this time, the image pickup element 11 reads, at the reading position 14, an image of one side of the document P1 being conveyed.

When images on both sides of the document P1 are read by the double-sided image reading portion 2, in addition to the reading operation for one side of the document P1 by the image pickup element 11, a reading operation for the other side of the document P1 by the image pickup element 22 is performed.

The image pickup element 22 emits light from its light source to the document P1. In the image pickup element 22, the light reflected from the document P1 is guided through the lens of the image pickup element to the line sensor of the same. Furthermore, light quantity data corresponding to the amount of light received by the line sensor is successively outputted from the image pickup element 22 to the image processing portion (not shown).

Thus, the double-sided image reading portion 2 is capable of reading an image formed on each of both sides of the document P1 while conveying the document P1 supplied from the ADF 17.

The sheet feed portion 3 is provided at the lowest part of the image forming apparatus 1, and feeds recording sheets. The sheet feed portion 3 is an examples of the recording sheet supply portion. The sheet feed portion 3 includes a sheet feed tray 23, a pickup roller 24, and a sheet feed roller 25.

Recording sheets on which images are to be formed by the double-sided image forming portion 4 are stacked on the sheet feed tray 23. The sheet feed tray 23 is supported in a casing 27. The pickup roller 24 and the sheet feed roller 25 are provided on the upper front side of the sheet feed tray 23.

The pickup roller 24 is rotated under a driving force of a conveyance motor (not shown), and feeds the recording sheets from the sheet feed tray 23. The sheet feed roller 25 conveys the recording sheets fed by the pickup roller 24, to the downstream side in the feeding direction.

The double-sided image forming portion 4 electrophotographically forms an image on a recording sheet having a prescribed size such as A size or B size, based on image data read by the double-sided image reading portion 2 or image data inputted from an information processing apparatus (communication apparatus) such as an external personal computer.

The double-sided image forming portion 4 transfers a toner image onto the recording sheet by using developer such as toner. Specifically, the double-sided image forming portion 4 includes a photosensitive drum 31, a charging portion 32, a developing portion 33, an LSU (Laser Scanning Unit) 34, a transfer portion 35, a clearing portion 36, and a fixing portion 37.

When an operation to start image forming is performed, the charging portion 32 charges the surface of the photosensitive drum 31 to have a uniform potential. Then, the LSU 34 scans the photosensitive drum 31 with laser light in accordance with the image data. Consequently, an electrostatic latent image is formed on the photosensitive drum 31.

Subsequently, the developing portion 33 causes the toner to adhere to the electrostatic latent image, thereby developing the electrostatic latent image on the photosensitive drum 31 into a toner image. Then, as a result of application of a predetermined transfer bias to the transfer portion 35, the transfer portion 35 transfers the toner image onto the recording sheet fed from the sheet feed tray 23.

The recording sheet onto which the toner image has been transferred is fed out to a conveyance path 38 provided between the double-sided image forming portion 4 and the fixing portion 37, and is conveyed to the fixing portion 37 disposed on the downstream side in the conveyance direction with respect to the double-sided image forming portion 4.

The fixing portion 37 includes a heating roller 39 and a pressure roller 40. During a fixing operation, the heating roller 39 is heated to a high temperature by a heating means such as an IH heater. While the recording sheet passes through a nip portion between the heating roller 39 and the pressure roller 40, the fixing portion 37 heats and melts the toner transferred onto the recording sheet. Consequently, the fixing portion 37 fixes the toner image transferred onto the recording sheet to that recording sheet.

The image forming apparatus 1 includes a conveyance path 41 on the downstream side in the conveyance direction with respect to the fixing portion 37. The recording sheet to which the toner image has been fixed by the fixing portion 37 is conveyed to the conveyance path 41. The conveyance path 41 curves upward from the fixing portion 37 and then extends in the vertical direction.

A plurality of sheet discharge rollers 42 capable of being rotated in both directions are provided at positions along the conveyance path 41. The sheet discharge rollers 42 are rotated under a driving force from a sheet discharge motor (not shown), and convey the recording sheet that has entered into the conveyance path 41, upward along the conveyance path 41.

The end edge of the conveyance path 41 serves as a sheet discharge port 26, and the sheet discharge rollers 42 allow the recording sheet to be discharged from the sheet discharge port 26 to the sheet discharge portion 5.

The double-sided image forming portion 4 has a double-sided image forming function of forming an image on each of both sides of a recording sheet P2 while conveying the recording sheet P2 supplied from the sheet feed portion 3.

Figure 3A:
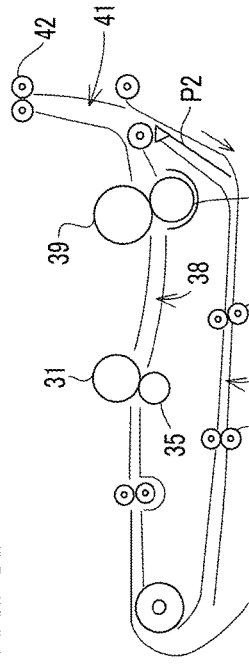
FIGS. 3A to 3F are diagrams illustrating a conveyance procedure followed when images are formed on both sides of a recording sheet.
Figure 3B:
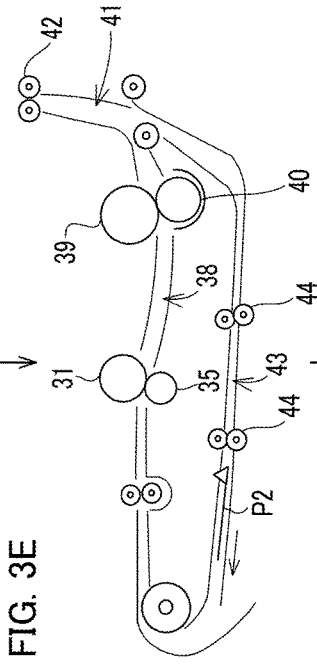
Figure 3C:
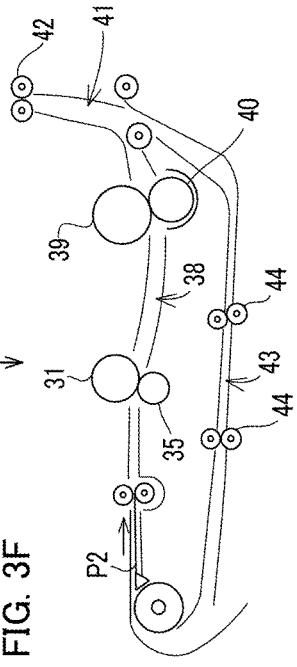

Specifically, the photosensitive drum 31 and so forth form a toner image on one side of the recording sheet P2 (FIG. 3A), and the fixing portion 37 fixes the toner image onto the recording sheet P2 (FIG. 3B). Furthermore, the sheet discharge rollers 42 convey the recording sheet P2 along the conveyance path 41 (FIG. 3C).

Next, the sheet discharge rollers 42 stop conveying the recording sheet P2 when a portion of the leading end of the recording sheet P2 in the conveyance direction exits from the sheet discharge port 26 to the sheet discharge portion 5 side. At this time, the sheet discharge rollers 42 nip and hold the recording sheet P2.

Subsequently, the sheet discharge rollers 42 are counter-rotated by being reversely driven by the sheet discharge motor. Consequently, the sheet discharge rollers 42 reversely feed the recording sheet P2 along the conveyance path 41.

The image forming apparatus 1 includes an inverse conveyance path 43. The inverse conveyance path 43 is connected to a connecting portion between the conveyance path 41 and the conveyance path 38, and to a predetermined position on the upstream side in the conveyance path 38. Also, a conveyance direction switching portion such as a flap (not shown) is provided at the connecting portion between the conveyance path 41 and the conveyance path 38. In addition, a plurality of conveyance rollers 44 are provided along the inverse conveyance path 43.

Figure 3D:
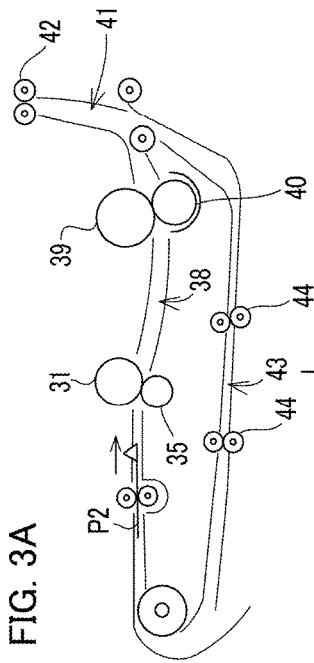
Figure 3E:
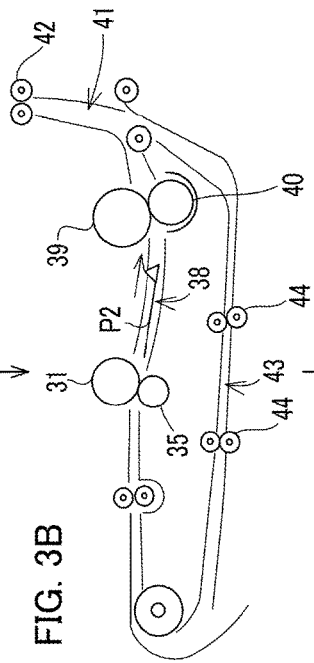
Figure 3F:
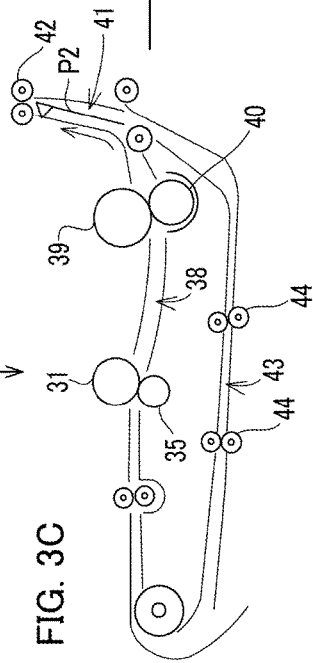

The recording sheet P2 that has been reversely fed along the conveyance path 41 is guided by the conveyance direction switching portion to the inverse conveyance path 43 (FIG. 3D). The conveyance rollers 44 convey the recording sheet P2 along the inverse conveyance path 43 to the predetermined position on the upstream side of the conveyance path 38 (FIG. 3E). Then, the image forming apparatus 1 conveys the recording sheet P2 along the conveyance path 38 again (FIG. 3F).

Consequently, the recording sheet P2 is introduced into the conveyance path 38, with its front and rear surfaces inverted. Accordingly, the photosensitive drum 31 and so forth form a toner image on the other surface of the recording sheet P2, and the fixing portion 37 fixes the toner image onto the recording sheet P2. Subsequently, the sheet discharge rollers 42 convey the recording sheet P2 along the conveyance path 41, and discharge the recording sheet P2 from the sheet discharge port 26 to the sheet discharge portion 5.

The image forming apparatus 1 includes, in addition to the double-sided image reading portion 2, the sheet feed portion 3, and the double-sided image forming portion 4, an operation display portion 50, a storage portion 51, a communication I/F portion 52, and a control portion 53. The aforementioned portions are communicably connected to each other by a bus B1.

The operation display portion 50 includes an operation portion 50A and a display portion 50B. The operation portion 50A includes one or more of various types of push button keys disposed adjacent to the display portion 50B, and a touch panel sensor disposed on a display screen of the display portion 50B and the like. The operation portion 50A receives operations to input various instructions from the user of the image forming apparatus 1. Upon receiving an operation to instruct execution of various types of processing such as an image reading operation from the user, the operation display portion 50 outputs an operation signal corresponding to that operation to the control portion 53. The display portion 50B includes, for example, a color liquid crystal display or the like, and displays various types of information to the user who is operating the operation portion 50A.

The storage portion 51 is configured by a computer-readable non-volatile memory such as an EEPROM. The communication I/F portion 52 is an interface that performs data communication with an external apparatus connected to the double-sided image forming portion 4 via a communication network such as the Internet or a LAN.

The control portion 53 includes a CPU (Central Processing Unit), a ROM (Read Only Memory), and a RAM (Random Access Memory). The CPU is a processor that executes various types of calculation processing. The ROM is a computer-readable non-volatile storage portion in which information for causing the CPU to execute various types of processing, such as a control program, is stored in advance. The RAM is a volatile storage portion that is used as a temporary storage memory (working area) for various types of processing executed by the CPU. The control portion 53 controls the operations of the image forming apparatus 1 by the CPU executing the program stored in the ROM.

Conventionally, there is known an image reading apparatus for obtaining an image of a document P1 having a size larger than the maximum readable size of the document P1. The image reading apparatus reads images on each of both sides of a document P1 that is folded in half, and combines the read two images.

Although there is a need for the function of forming an original image having a size larger than the maximum recording sheet size on which an image can be formed, on a recording sheet having a size larger than that maximum size, such a need has not been met. Therefore, in the present embodiment, the image forming apparatus 1 has the following configuration.

In the present embodiment, the operation display portion 50 includes a copy mode selecting operation portion 503. The copy mode selecting operation portion 503 is an operation portion that receives an operation to select the operation mode of the double-sided image reading portion 2 and the double-sided image forming portion 4.

The operation mode includes a special copy mode and a normal copy mode, which is a mode other than the special copy mode. The special copy mode is a mode in which images on the two document surfaces of the folded document P1 that is folded in half are read by the double-sided image reading portion 2, and these images are formed on the two recording surfaces of the folded recording sheet P2 that is folded in half by the double-sided image forming portion 4. In the following, the two document surfaces of the folded document P1 are referred to as a first document surface P11 and a second document surface P12, and the two recording surfaces of the folded recording sheet P2 are referred to as a first recording surface P21 and a second recording surface P22.

Note that the special copy mode is an example of a first image forming operation mode in which the folded recording sheet P2 is supplied to the double-sided image forming portion 4. The normal copy mode is an example of a second image forming operation mode, which is a mode other than the first image forming operation mode. The normal copy mode may be, for example, a mode in which an image read by the double-sided image reading portion 2 from one of the first document surface and the second document surface of the document P1 is formed on one of the first recording surface and the second recording surface of the recording sheet P2 by the double-sided image forming portion 4.

Figure 2:
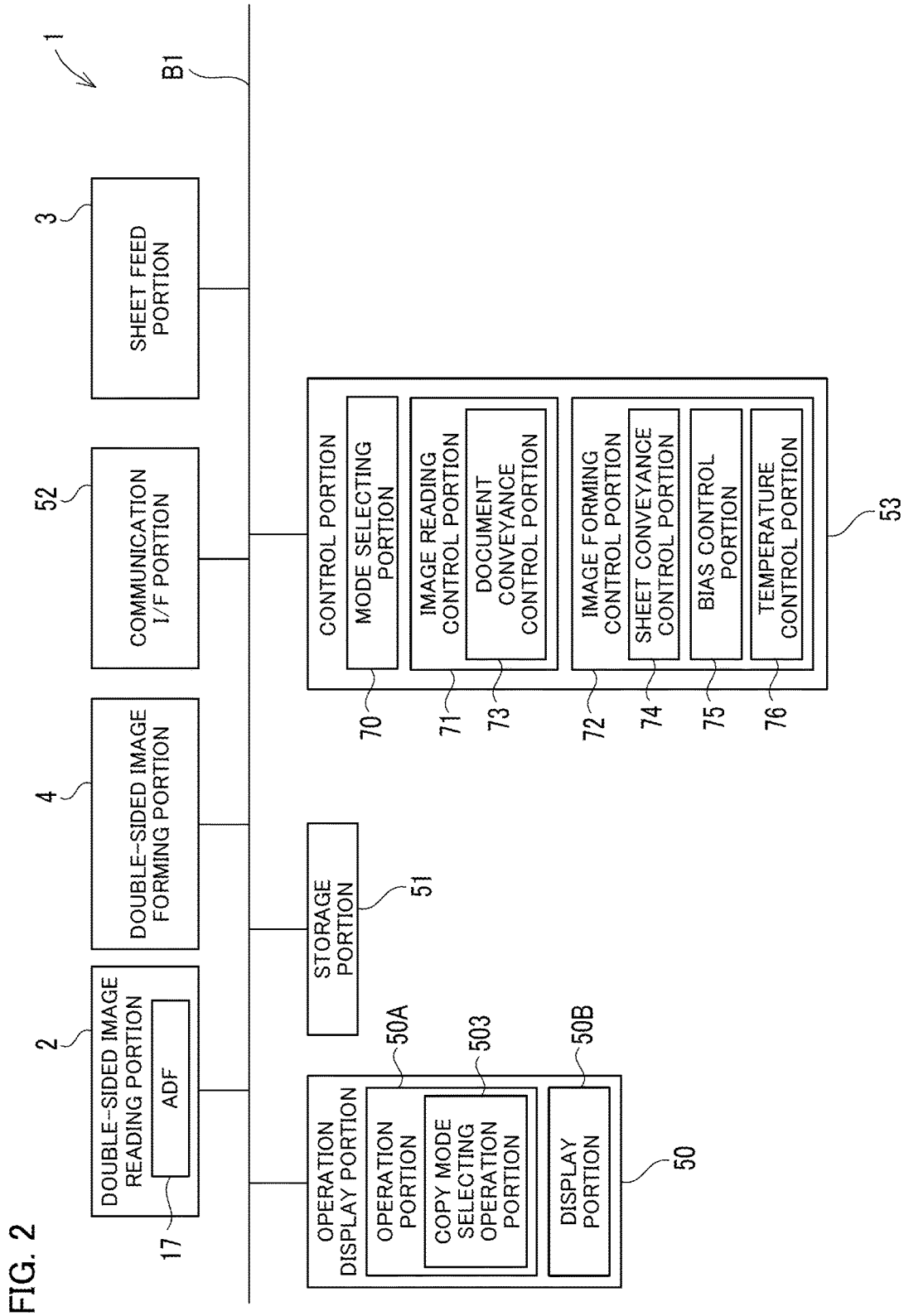
FIG. 2 is a block diagram showing a configuration of the image forming apparatus according to the first embodiment of the present disclosure.

As shown in FIG. 2, the control portion 53 includes a mode selecting portion 70, an image reading control portion 71, and an image forming control portion 72. For example, the mode selecting portion 70, the image reading control portion 71 and the image forming control portion 72 are realized by the CPU executing the image processing programs corresponding to the respective types of processing. Note that a configuration in which a part or a plurality of functions of the control portion 53 are provided as electronic circuits is conceivable as another embodiment.

When an operation to select the operation mode of the double-sided image reading portion 2 and the double-sided image forming portion 4 is performed via the copy mode selecting operation portion 503, the mode selecting portion 70 selects, as the operation mode of the image forming apparatus 1, the operation mode selected via the copy mode selecting operation portion 503. That is, the mode selecting portion 70 selects the special copy mode as the operation mode of the image forming apparatus 1 when an operation to select the special copy mode is performed via the copy mode selecting operation portion 503. On the other hand, when an operation to select the normal copy mode is performed via the copy mode selecting operation portion 503, the mode selecting portion 70 selects the normal copy mode as the operation mode of the image forming apparatus 1.

When the special copy mode is selected by the mode selecting portion 70, the image reading control portion 71 causes the double-sided image reading portion 2 to perform the following processing. This processing is processing of reading images formed on both sides of the document P1 while conveying the folded document P1 supplied from the document placement portion 18.

Accordingly, the process of reading an image formed on each of the first document surface P11 and the second document surface P12 of the folded document P1 is performed by the double-sided image reading portion 2. Then, the image forming control portion 72 processes, as one divided image G1 (see FIG. 4C), the image on the first document surface P11 of the folded document P1 obtained by the image pickup element 11. Furthermore, the image forming control portion 72 processes, as the other divided image G2 (see FIG. 4C), the image on the second document surface P12 of the folded document P1 obtained by the image pickup element 22.

In the above-described case, a fold line L1 of the folded document P1 constitutes a dividing line that divides the original image formed on the folded document P1 into the divided image G1 and the divided image G2.

The double-sided image reading portion 2 is an example of a divided image acquiring portion that acquires a pair of divided images G1 and G2 each constituting a half of the original image.

The image reading control portion 71 includes a document conveyance control portion 73. When the special copy mode is selected by the mode selecting portion 70, the document conveyance control portion 73 sets the conveyance speed of the document P1 by the conveyance roller pairs 19 to a lower speed than when the normal copy mode is selected.

The folded document P1 tends to experience slippage between a sheet portion of the first document surface P11 side and a sheet portion of the second document surface P12 side. If the folded document P1 is conveyed at a speed lower than the conveyance speed of a document that is not folded, a conveyance failure due to the slippage will be less likely to occur.

When the special copy mode is selected by the mode selecting portion 70, the image forming control portion 72 causes the double-sided image forming portion 4 to perform the following processing. This processing is processing of forming an image on each of the first recording surface P21 and the second recording surface P22 while conveying the folded recording sheet P2 supplied from the sheet feed portion 3.

Accordingly, the processing of forming the divided images G1 and G2, obtained by the double-sided image reading operation by the double-sided image reading portion 2, on the first recording surface P21 and the second recording surface P22, respectively, of the folded recording sheet P2 is performed by the double-sided image forming portion 4.

Figure 5B:
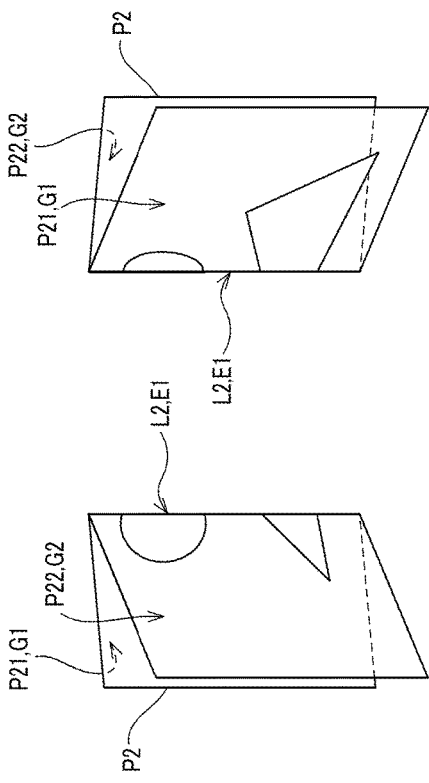
FIG. 5B is a diagram showing the folded recording sheet on which a pair of divided images have been formed on the first and the second recording surfaces.
Figure 5C:
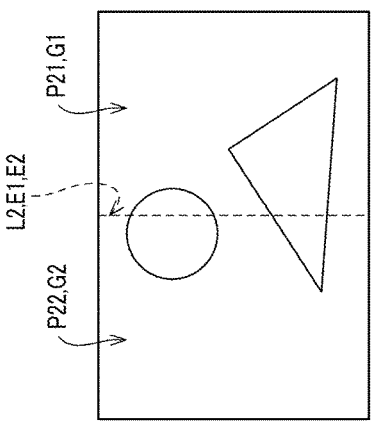
FIG. 5C is a diagram showing a state in which the folded recording sheet shown in FIG. 5B is opened.
Figure 5A:
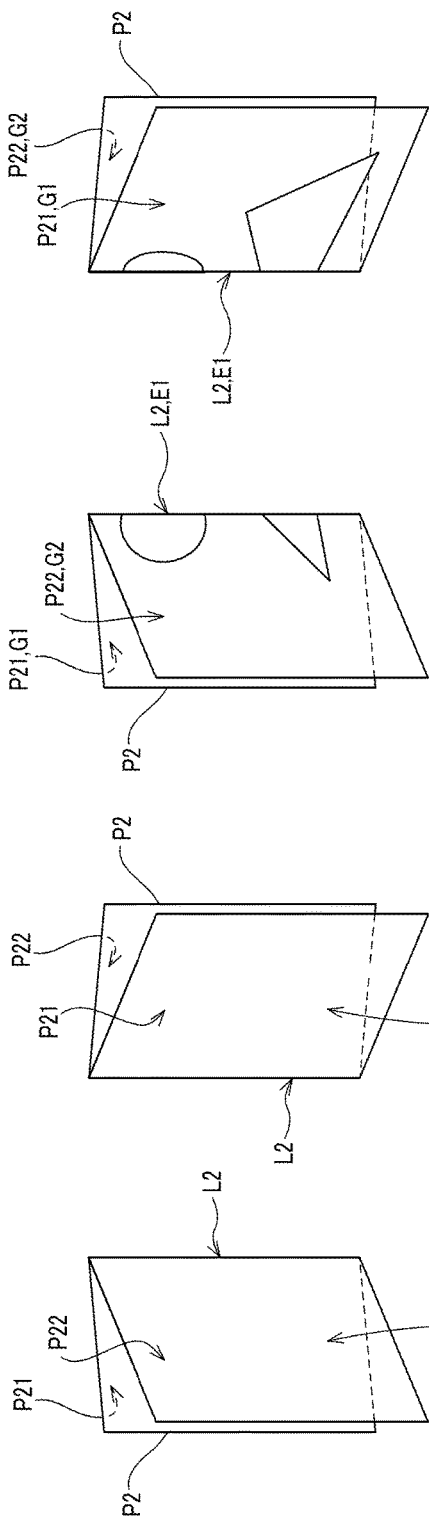
FIG. 5A is a diagram showing a state in which a pair of divided images are formed on a first recording surface and a second recording surface of a folded recording sheet.

That is, as shown in FIG. 5A, the double-sided image forming portion 4 forms the divided image G1 on the first recording surface P21 of the folded recording sheet P2, causes the folded recording sheet P2 to be inverted by the conveyance direction switching portion, and subsequently forms the divided image G2 on the second recording surface P22.

Here, the front and rear ends of the recording sheet P2 in the conveyance direction when the recording sheet is conveyed with the first recording surface P21 of the folded recording sheet P2 in contact with the photosensitive drum 31 are reversed to those when the recording sheet is conveyed with the second recording surface P22 in contact with the photosensitive drum 31. The triangles in FIGS. 3A to 3F indicate the direction in which the first recording surface P21 at the front end portion of the folded recording sheet P2 faces when the first recording surface P21 is conveyed to the photosensitive drum 31.

As shown in FIGS. 3A to 3F, the end portion of the folded recording sheet P2 that serves as the front end in the conveyance direction when the toner image of the photosensitive drum 31 is transferred onto the first recording surface P21 (FIG. 3A) serves as the rear end in the conveyance direction when the toner image of the photosensitive drum 31 is transferred onto the second recording surface P22 (FIG. 3F).

For example, a case will be discussed where a fold line L2 of the folded recording sheet P2 constitutes the right end of the folded recording sheet P2 as viewed from the photosensitive drum 31 side. In this case, the image forming control portion 72 controls the double-sided image forming portion 4 such that an image is formed in a state in which the upper end edge and the right end edge of the divided image G1 extend along the front end edge and the right end edge, respectively, of the folded recording sheet P2 in the processing of forming an image on the first recording surface P21 of the folded recording sheet P2.

Furthermore, the image forming control portion 72 controls the double-sided image forming portion 4 such that the lower end edge and the left end edge of the divided image G2 are extend along the front end edge and the right end edge, respectively, of the inverted folded recording sheet P2 in the process of forming an image on the second recording surface P22 of the folded recording sheet P2. Note that when the fold line L2 of the folded recording sheet P2 as viewed from the photosensitive drum 31 is at the left end, the left-right positional relationship in the above-described description may be reversed.

After the both-sided image forming processing has been performed as described above, the divided images G1 and G2 are formed on the first recording surface P21 and the second recording surface P22, respectively, as shown in FIGS. 5A and 5B. At this time, the divided images G1 and G2 are formed in an orientation in which edges E1 and E2, each constituting the dividing line on the original image, of the divided image G1 and G2 extend along the fold line L2 of the folded recording sheet P2. As a result, a recording sheet on which the original image composed of the connected divided images G1 and G2 is formed, is obtained as shown in FIG. 5C.

The image forming control portion 72 includes a sheet conveyance control portion 74, a bias control portion 75, and a temperature control portion 76.

When the special copy mode is selected by the mode selecting portion 70, the sheet conveyance control portion 74 sets the conveyance speed of the recording sheet by the conveyance rollers 44 and so forth to a lower speed than when the normal copy mode is selected.

The folded recording sheet P2 tends to experience slippage between a sheet portion of the first recording surface P21 side and a sheet portion of the second recording surface P22 side. If the folded recording sheet P2 is conveyed at a speed lower than the conveyance speed of an ordinary single-ply recording sheet, a conveyance failure due to the slippage will be less likely to occur. The sheet conveyance control portion 74 corresponds to a conveyance control portion.

When the special copy mode is selected by the mode selecting portion 70, the bias control portion 75 sets the transfer bias applied to the transfer portion 35 to a higher bias than when the normal copy mode is selected.

This is to prevent an insufficient potential difference between the photosensitive drum 31 and one of the pair of sheet portions that faces the photosensitive drum 31 due to overlapping of the pair of sheet portions.

When the special copy mode is selected by the mode selecting portion 70, the temperature control portion 76 sets the heating temperature for fixing the image onto the recording sheet by the fixing portion 37 to a higher temperature than when the normal copy mode is selected.

Due to the overlapping of the pair of sheet portions, the heat capacity of the object to be fixed by the fixing portion 37 is increased. Therefore, there is the possibility that the fixing portion 37 may provide less heat as compared with when the object to be fixed is a single recording sheet, which may lead to poor fixation. To prevent such poor fixation, the heating temperature of the fixing portion 37 is set high.

Figure 6:
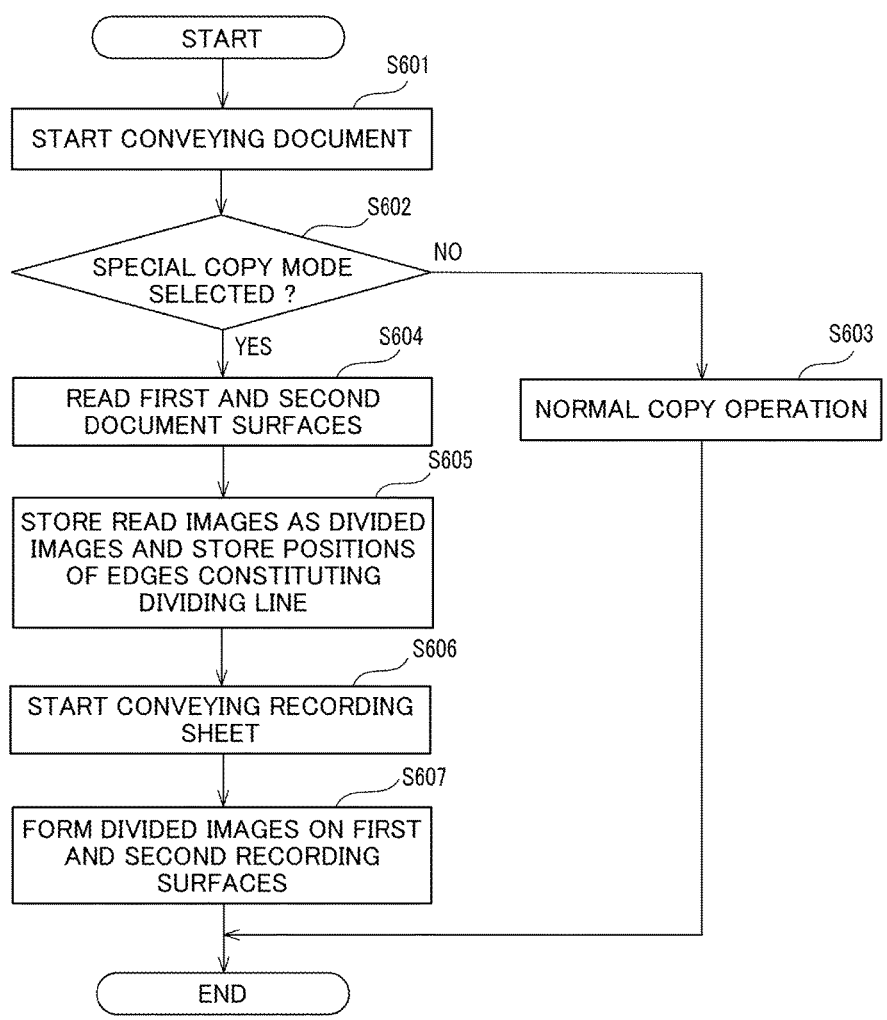
FIG. 6 is a flowchart illustrating reading processing performed by a control portion.

Next, the processing performed by the control portion 53 will be described with reference to FIG. 6. Note that steps S601, S602, . . . in the flowchart of FIG. 6 denote the processing procedure (step) numbers.

<Step S601>

At step S601, the document conveyance control portion 73 causes the conveyance roller pairs 19 and so forth to start the operation of conveying the document P1. This step is performed when an operation to start copying is performed on the operation display portion 50. Then, the control portion 53 advances the processing to step S602.

<Step S602>

At step S602, the control portion 53 determines whether or not the operation mode selected via the copy mode selecting operation portion 503 is the special copy mode. If it is determined that the operation mode selected via the copy mode selecting operation portion 503 is not the special copy mode (NO at step S602), the control portion 53 advances the processing to step S603. On the other hand, if it is determined that the selected operation mode is the special copy mode (YES at step S602), the control portion 53 advances the processing to step S604.

<Step S603>

If the selected operation mode is the normal copy mode, the image reading control portion 71 and the image forming control portion 72 cause the double-sided image reading portion 2 and the double-sided image forming portion 4 to perform a normal copy operation. Then, the control portion 53 ends the processing.

<Step S604>

If the selected operation mode is the special copy mode, the image reading control portion 71 causes the double-sided image reading portion 2 (the image pickup element 11 and the image pickup element 22) to read the image formed on each of the first document surface P11 and the second document surface P12 of the folded document P1. Then, the control portion 53 advances the processing to step S605.

<Step S605>

At step S605, the image reading control portion 71 temporarily stores the divided image G1 (see FIG. 4C) read from the first document surface P11 and the divided image G2 (see FIG. 4C) read from the second document surface P12.

<Step S606>

At step S606, the sheet conveyance control portion 74 causes the conveyance rollers 44 and so forth to start conveying the recording sheet P2. Note that the timing of starting conveyance of the recording sheet P2 by the conveyance rollers 44 and so forth is not limited to the timing after step S605.

In addition, the image reading control portion 71 temporarily stores the positions of the edges E1 and E2, each constituting the dividing line on the original image, of the pair of divided images G1 and G2. Then, the control portion 53 advances the processing to step S607.

<Step S607>

At step S607, the image forming control portion 72 causes the double-sided image forming portion 4 to form the divided images G1 and G2, temporarily stored at step S605, on the first recording surface P21 and the second recording surface P22, respectively, of the folded recording sheet P2.

For example, when the fold line L2 of the folded recording sheet P2 constitutes the right end of the folded recording sheet P2 as viewed from the photosensitive drum 31 side, the image forming control portion 72 causes the double-sided image forming portion 4 to form the divided images G1 and G2 in the following manner.

The image forming control portion 72 controls the double-sided image forming portion 4 such that an image is formed in a state in which the upper end edge and the right end edge of the divided image G1 extend along the front end edge and the right end edge, respectively, of the folded recording sheet P2 in the processing of forming an image on the first recording surface P21 of the folded recording sheet P2.

Furthermore, the image forming control portion 72 controls the double-sided image forming portion 4 such that the lower end edge and the left end edge of the divided image G2 extend along the front end edge and the right end edge, respectively, of the inverted folded recording sheet P2 in the processing of forming an image on the second recording surface P22 of the folded recording sheet P2.

Consequently, the divided images G1 and G2 are formed on the first recording surface P21 and the second recording surface P22, respectively, in an orientation in which the edges E1 and E2, each constituting the dividing line on the original image, of the divided images G1 and G2 extend along the fold line L2 of the folded recording sheet P2.

With the processing as described above, an image forming apparatus 1 for which an A4 recording sheet, for example, is the maximum size recording sheet on which an image can be formed, can form the original image on an A3-size recording sheet.

That is, the image forming apparatus 1 can form the original image on an A3-size recording sheet by forming the divided images G1 and G2 on the first recording surface P21 and the second recording surface P22, respectively, of an A3-size recording sheet P2 that is folded into A4 size.

Therefore, it is possible to form an original image having a size larger than the maximum recording sheet size on which an image can be formed, on a recording sheet having a size larger than the maximum size.

Although a preferred embodiment of the present disclosure has been described above, the present disclosure is not intended to be limited to the above-described embodiment, and various modifications are possible.

(1) In the first embodiment, the special copy processing is performed when the special copy mode is selected via the copy mode selecting operation portion 503. In the special copy processing, the double-sided image reading portion 2 reads the pair of divided images G1 and G2 formed respectively on both sides of the folded document P1, and the double-sided image forming portion 4 forms the divided images G1 and G2 respectively on both sides of the folded recording sheet P2.

Note, however, that the case where the special copy processing is performed is not limited to the case where the special copy mode is selected by detection of an operation performed on the copy mode selecting operation portion 503. For example, a modification is conceivable in which the image forming apparatus 1 has the function of selecting the special copy mode by automatically determining whether or not to perform the special copy processing. This modification will be described below An image forming apparatus 100 according to the present modification has the following two functions. The first function is to detect whether or not the document P1 supplied from the document placement portion 18 is a folded document P1. The second function is to detect whether or not the recording sheet supplied from the sheet feed portion 3 is a folded recording sheet P2.

Figure 7:
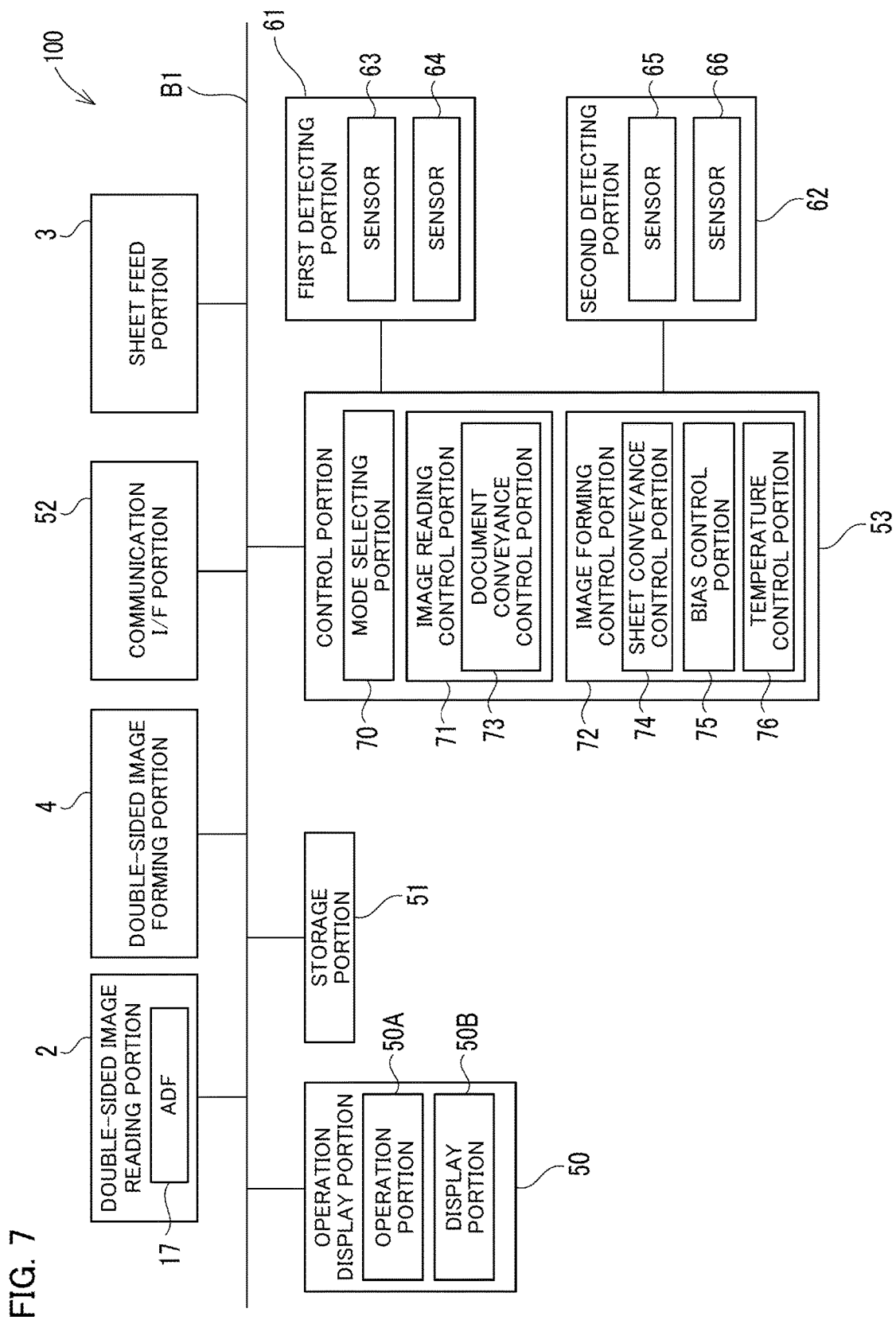
FIG. 7 is a block diagram showing a configuration according to a modification.

As shown in FIG. 7, the image forming apparatus 100 includes a first detecting portion 61 and a second detecting portion 62. The first detecting portion 61 and the second detecting portion 62 are electrically connected to the control portion 53.

Figure 8A:
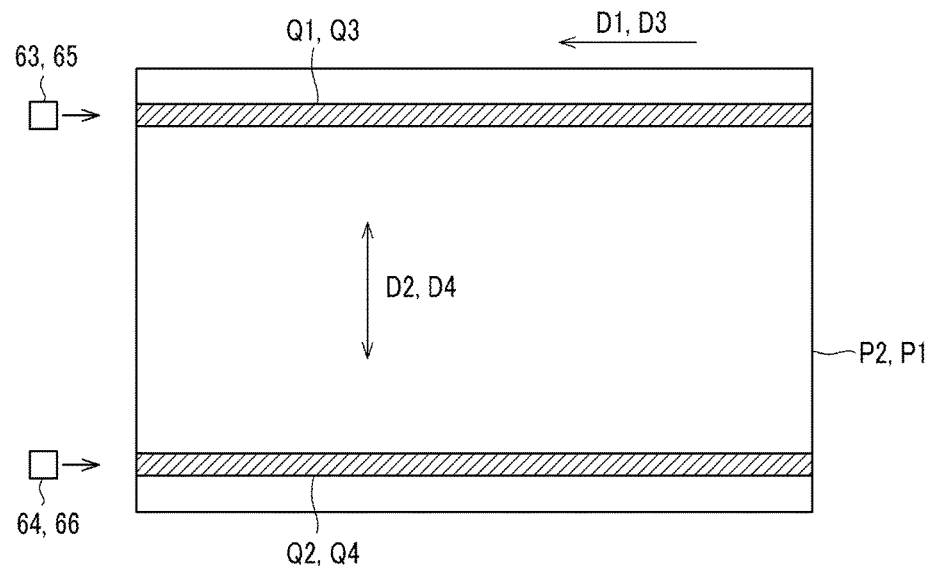
FIG. 8A is a diagram showing positions detected by a first detecting portion and a second detecting portion on a document or a recording sheet.

As shown in FIG. 8A, the first detecting portion 61 detects the overlapping state of the recording sheet P2 fed from the sheet feed portion 3, at two detected portions Q1 and Q2 located at positions closer to opposite ends in a width direction D2 orthogonal to a feeding direction D1 of the recording sheet P2.

The first detecting portion 61 detects the overlapping state of the recording sheet P2 before the image formation by the double-sided image forming portion 4 is performed. Thus, the first detecting portion 61 is provided at a predetermined position on a conveyance path of the recording sheet P2 between the sheet feed roller 25 and the position of transfer performed by the photosensitive drum 31 and the transfer portion 35.

The first detecting portion 61 includes a sensor 63 and a sensor 64. The sensor 63 and the sensor 64 have a configuration similar to each other. The present modification employs an ultrasonic sensor that outputs ultrasonic waves to the recording sheet P2, and receives transmitted waves resulting therefrom.

The sensors 63 and 64 include transmitters 63A and 64A that transmit ultrasonic waves to the recording sheet P2, and receivers 63B and 64B that receive the ultrasonic waves that have passed through the recording sheet P2. The transmitters 63A and 64A oppose the receivers 63B and 64B, respectively, with the conveyance path of the recording sheet P2 therebetween. The ultrasonic waves transmitted from the transmitters 63A and 64A attenuate while passing through the recording sheet P2. In the case of a sheet with an overlap, the amount of attenuation of the ultrasonic waves is greater than in the case of a sheet with no overlap, and as a result, the intensity (detection level) of the received ultrasonic waves becomes lower.

The second detecting portion 62 detects the overlapping state of the document P1 fed from the ADF 17, at two detected portions Q3 and Q4 located at positions closer to opposite ends in a width direction D4 orthogonal to a feeding direction D3 of the document P1.

The second detecting portion 62 detects the overlapping state of the document P1 before reading by the reading unit 7 is performed. Thus, the second detecting portion 62 is placed at a predetermined position on the conveyance path of the document P1 by the conveyance roller pairs 19 before the position read by the reading unit 7.

The second detecting portion 62 includes a sensor 65 and a sensor 66. The sensor 65 and the sensor 66 have a configuration similar to that of the sensor 63 and the sensor 64 of the first detecting portion 61. Note that the illustration of the document P1 and the sensors 65 and 66 has been omitted in FIGS. 8B, 8C, 8D and 8E.

The mode selecting portion 70 determines whether or not to select the special copy mode as the operation mode of the image forming apparatus 100. Determination of whether or not to select the special copy mode is performed based on determination of whether or not the document P1 is a folded document and whether or not the recording sheet P2 is a folded recording sheet. Determination of whether or not the document P1 is a folded document and whether or not the recording sheet P2 is a folded recording sheet is made based on the signal levels of the signals outputted by the first detecting portion 61 and the second detecting portion 62.

Figure 8B:
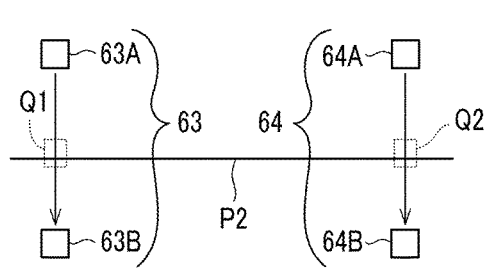
FIG. 8B is a diagram showing a state in which a single sheet of a document or a recording sheet has passed through a region detected by the first detecting portion and the second detecting portion.

That is, when the level of the detection signal of each of the two detected portions Q1 and Q2 shown in FIG. 8A is greater than a first threshold, the detection signals indicate a normal conveyance state in which a single recording sheet P2 that is not folded is conveyed (see FIG. 8B). The first threshold is a predetermined value.

Figure 8D:
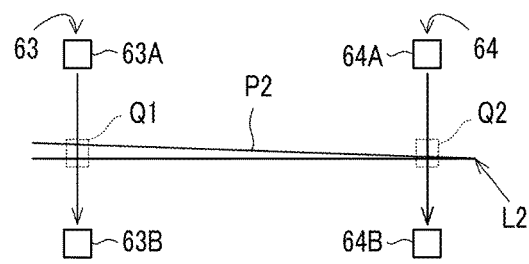
FIG. 8D is a diagram showing a state in which the folded document or the folded recording sheet has passed through the region detected by the first detecting portion and the second detecting portion.
Figure 8C:
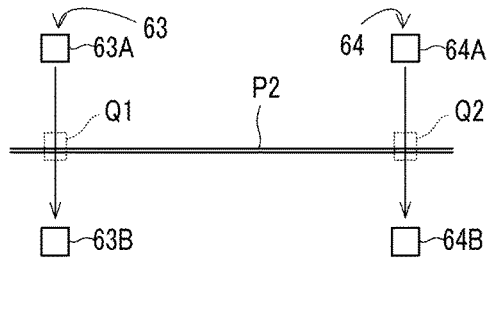
FIG. 8C is a diagram showing a multi-feeding state.

When the level of the detection signal of each of the two detected portions Q1 and Q2 is less than the first threshold and the level difference between the detection signals of the detected portions Q1 and Q2 is less than or equal to a second threshold, the detection signals indicate a multi-feeding state in which a plurality of recording sheets P2 are multi-fed (see FIG. 8C). The second threshold is a predetermined value.

Figure 8E:
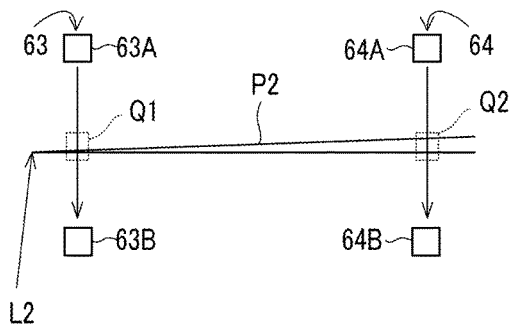
FIG. 8E is a diagram showing a state in which a fold line is located opposite to that in FIG. 8D.

When the level of the detection signal of each of the two detected portions Q1 and Q2 is less than the first threshold and the level difference exceeds the second threshold, the detection signals indicate a conveyance state in which a folded recording sheet P2 that is folded in half along the fold line L2 is conveyed (see FIGS. 8D and 8E). The first recording surface P21 and the second recording surface P22 are formed on the folded recording sheet P2 by the fold line L2.

If it is determined that the state is the conveyance state in which the folded recording sheet P2 is conveyed, one of the opposite ends of the folded recording sheet P2 in the width direction D2 that is closer to the sensor with a greater signal level indicates the fold line L2.

That is, in the state shown in FIG. 8D, the level of the detection signal from the sensor 64 is greater than the level of the detection signal from the sensor 63. Therefore, the end closer to the sensor 64, which has a greater signal level, indicates the fold line L2.

On the other hand, in the state shown in FIG. 8E, the level of the detection signal from the sensor 63 is greater than the level of the detection signal from the sensor 64. Therefore, the end closer to the sensor 63, which has a greater signal level, indicates the fold line L2. Note that the method for detecting the state of the document P1 being conveyed is similar to the method for detecting the recording sheet P2 being conveyed. Therefore, the description thereof has been omitted.

Thus, the mode selecting portion 70 determines whether or not the document P1 is a folded document and whether or not the recording sheet P2 is a folded recording sheet, based on the signal levels of the signals outputted by the first detecting portion 61 and the second detecting portion 62. The above-described determination may also be made based on whether or not another condition is satisfied, in addition to the condition that the level of the detection signal of each of the two detected portions Q1 and Q2 is less than the first threshold and the level difference exceeds the second threshold.

Then, if it is determined that the document P1 is a folded document P1 and that the recording sheet P2 is a folded recording sheet, the mode selecting portion 70 selects the special copy mode as the operation mode of the image forming apparatus 100. On the other hand, if the condition that the document P1 is a folded document P1 and the recording sheet P2 is a folded recording sheet is not satisfied, the mode selecting portion 70 selects the normal copy mode as the operation mode of the image forming apparatus 100.

When the special copy mode is selected by the mode selecting portion 70, the image reading control portion 71 and the image forming control portion 72 cause the double-sided image reading portion 2 and the double-sided image forming portion 4 to perform the special copy processing.

As described above, the image forming apparatus 100 according to the present modification has the function of automatically determining whether or not to perform the special copy processing, based on the detection signals of the first detecting portion 61 and the second detecting portion 62. This makes it possible to omit the user operation to select the special copy mode via the copy mode selecting operation portion 503 that is required in the first embodiment.

(2) In the first embodiment, the images read from the first document surface P11 and the second document surface P12 of the folded document P1 are the divided images G1 and G2 formed on the folded recording sheet P2. However, the divided images G1 and G2 are not limited thereto, and it is possible to adopt the following modification.

Figure 9:
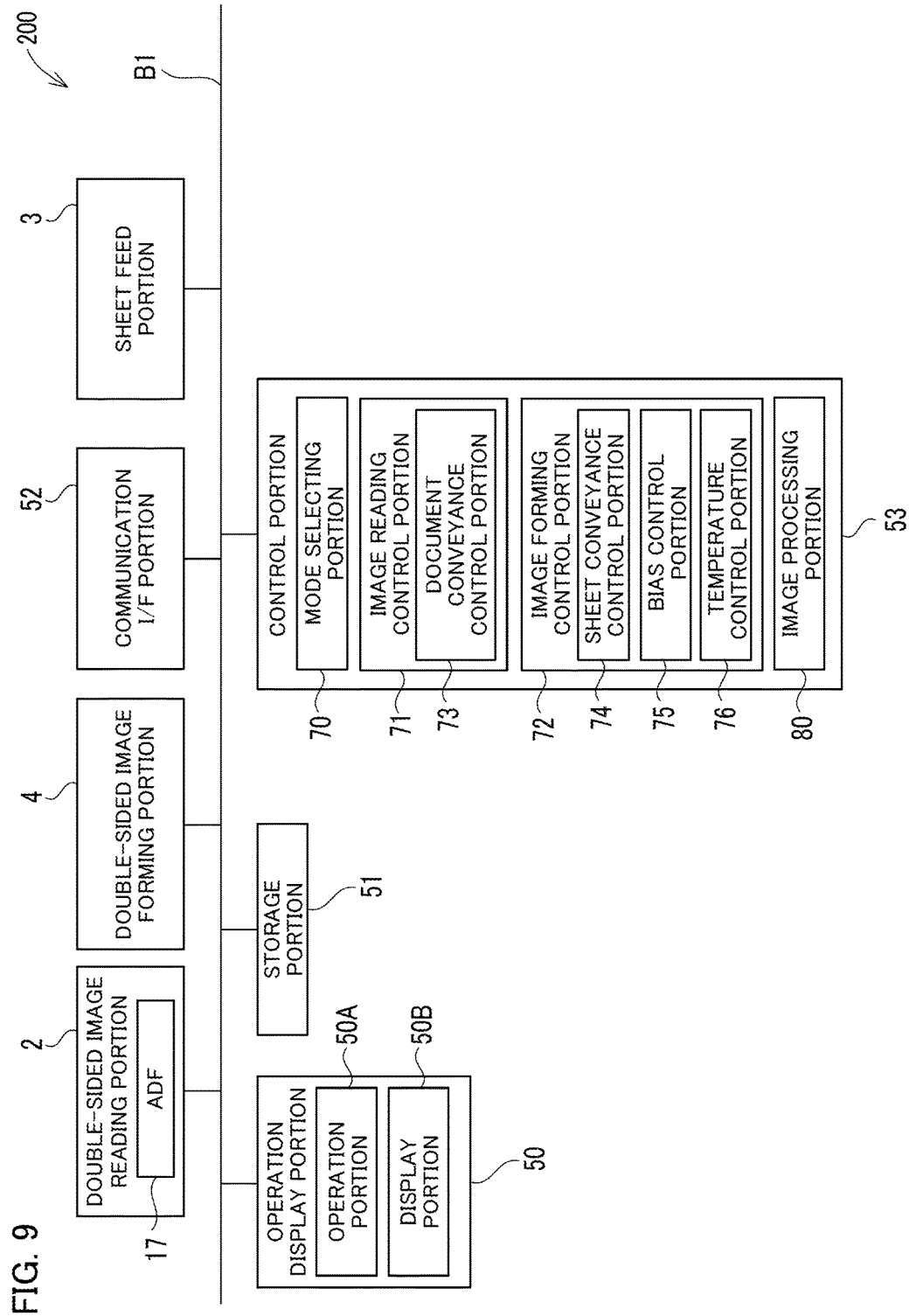
FIG. 9 is a block diagram showing a configuration according to another modification.

FIG. 9 is a block diagram showing a configuration of another modification.

As shown in FIG. 9, an image forming apparatus 200 according to the present modification is different from the image forming apparatus 1 of the first embodiment because the image forming apparatus 200 includes an image processing portion 80. Although the control portion 53 includes the image processing portion 80 in the present modification, the present modification is not limited thereto, and it is possible to adopt a configuration in which the image processing portion 80 described below is provided separately from the control portion 53.

The image processing portion 80 generates, as a pair of divided images G1 and G2, enlarged images of a pair of images each constituting a half of the original image read by the double-sided image reading portion 2 in a single-sided image reading mode in which an image of one of the first document surface and the second document surface of the document P1 is read. For example, the image processing portion 80 enlarges the image (original image) of an A4-size document P1 read in the single-sided reading image mode into A3 size, and divides the enlarged image in half to generate a pair of divided A4-size images. It is also conceivable that the image processing portion 80 divides an image (original image) of an A4-size document P1 in half, and subsequently enlarge each of the divided images into A4 size to generate a pair of divided images G1 and G2. In this case, the double-sided image reading portion 2 corresponds to the original image acquiring portion.

Also, the image processing portion 80 may generate, as the pair of divided images G1 and G2, enlarged images of a pair of images each constituting a half of the original image when the communication I/F portion 52 receives the original image from a communication apparatus communicably connected to the image forming apparatus 200. The communication apparatus is, for example, a personal computer, or another image forming apparatus such as a facsimile apparatus or a multifunction peripheral. In this case, the communication I/F portion 52 corresponds to the original image acquiring portion.

As such, it is also possible to adopt an embodiment in which the image processing portion 80 generates, as the pair of divided images G1 and G2, enlarged images of a pair of images each constituting a half of the original image. In this case, the image processing portion 80 serves as a component of the divided image acquiring portion.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
a recording sheet supply portion configured to feed a recording sheet;
a double-sided image forming portion capable of forming an image on each of a first recording surface of the recording sheet and a second recording surface opposite the first recording surface, respectively, of the recording sheet, while conveying the recording sheet supplied from the recording sheet supply portion;
a divided image acquiring portion configured to acquire a pair of divided images each constituting a half of an original image;
an image forming control portion configured to supply a folded recording sheet that is the recording sheet folded in half to the double-sided image forming portion, and cause the double-sided image forming portion to perform processing of forming the pair of divided images on the first recording surface and the second recording surface, respectively, of the folded recording sheet;
a processor configured to execute a mode selecting portion, wherein the mode selecting portion is configured to select one of a first image forming operation mode and a second image forming operation mode, the first image forming operation mode being an operation mode in which the folded recording sheet is supplied to the double-sided image forming portion, the second image forming operation mode being an operation mode in which the recording sheet that is not folded is supplied to the double-sided image forming portion; and
a first detecting portion configured to detect an overlapping state of the recording sheet based on levels of detection signals of transmitted waves resulting from ultrasonic waves at two detected portions of the recording sheet,
wherein the image forming control portion includes a conveyance control portion configured to, when the first image forming operation mode is selected by the mode selecting portion, set a conveyance speed of the recording sheet to a lower speed than when the second image forming operation mode is selected by the mode selecting portion,
wherein the two detected portions are portions of the recording sheet fed from the recording sheet supply portion that are located at positions close to opposite ends in a width direction orthogonal to a feeding direction of the recording sheet,
wherein the processor is configured to determine that one of the detected portions is a folded-back portion of the folded recording sheet and select the first image forming operation mode when a level of a detection signal of each of the two detected portions that is outputted from the first detecting portion and a level difference between the detection signals of the two detected portions satisfy a predetermined first condition, and select the second image forming operation mode when the level of the detection signal of each of the two detected portions that is outputted from the first detecting portion and the level difference between the detection signals of the two detected portions do not satisfy the first condition, and
wherein when the first image forming operation mode is selected by the mode selecting portion, the image forming control portion causes the double-sided image forming portion to perform processing of forming the pair of divided images on the folded recording sheet such that edges of the pair of divided images, each forming a dividing line on the original image, extend along a fold line of the folded recording sheet, with the fold line of the folded recording sheet being at one of the opposite ends of the folded recording sheet in the width direction, the one of the opposite ends being determined by a result of a comparison between levels of two detection signals of the two detected portions outputted from the first detecting portion.

2. The image forming apparatus according to claim 1, wherein the first condition includes a condition that the level of the detection signal of each of the two detected portions and a predetermined threshold are in a fixed magnitude relationship and the level difference exceeds a predetermined value.

3. An image forming apparatus comprising:
a recording sheet supply portion configured to feed a recording sheet;
a double-sided image forming portion capable of forming an image on each of a first recording surface of the recording sheet and a second recording surface opposite the first recording surface, respectively, of the recording sheet, while conveying the recording sheet supplied from the recording sheet supply portion;
a divided image acquiring portion configured to acquire a pair of divided images each constituting a half of an original image;
an image forming control portion configured to supply a folded recording sheet that is the recording sheet folded in half to the double-sided image forming portion, and cause the double-sided image forming portion to perform processing of forming the pair of divided images on the first recording surface and the second recording surface, respectively, of the folded recording sheet;
a document supply portion configured to feed a document;
a double-sided image reading portion capable of reading an image formed on each of a first document surface of the document and a second document surface opposite the first document surface while conveying the document supplied from the document supply portion;
a processor configured to execute a mode selecting portion and an image reading control portion, wherein the mode selecting portion is configured to select one of a first image forming operation mode and a second image forming operation mode, and the image reading control portion is configured to control the double-sided image reading portion; and
a second detecting portion configured to detect an overlapping state of the document based on levels of detection signals of transmitted waves resulting from ultrasonic waves at two detected portions of the document fed from the document supply portion that are located at positions close to opposite ends in a width direction orthogonal to a feeding direction of the document,
wherein the divided image acquiring portion serves as the double-sided image reading portion when images of the first document surface and the second document surface of a folded document that is the document folded in half are read as the pair of divided images,
wherein the first image forming operation mode is an operation mode in which the folded recording sheet is supplied to the double-sided image forming portion,
wherein the second image forming operation mode is an operation mode in which the recording sheet that is not folded is supplied to the double-sided image forming portion,
wherein when the first image forming operation mode is selected by the mode selecting portion in a state in which a level of a detection signal of each of the two detected portions that is outputted from the second detecting portion and a level difference between the detection signals of the two detected portions satisfy a predetermined second condition, the image reading control portion stores a position of one of the opposite ends of the document in the width direction, as a position of edges of the pair of divided images, each forming a dividing line on the original image, the one of the opposite ends being determined by a result of a comparison between levels of two detection signals of the two detected portions outputted from the second detecting portion, and the image forming control portion causes the double-sided image forming portion to form, as the pair of divided images, images of the first document surface and the second document surface read by the double-sided image reading portion from the document supplied from the document supply portion, and
wherein when the first image forming operation mode is selected by the mode selecting portion, the image forming control portion causes the double-sided image forming portion to perform the processing of forming the pair of divided images on the folded recording sheet such that the edges of the pair of divided images extend along a fold line of the folded recording sheet.

4. The image forming apparatus according to claim 3, wherein the second condition includes a condition that the level of the detection signal of each of the two detected portions that is outputted from the second detecting portion and a predetermined threshold are in a fixed magnitude relationship and the level difference exceeds a predetermined value.

5. The image forming apparatus according to claim 3, wherein the processor is further configured to execute an image processing portion configured to generate an enlarged image of the original image read by the double-sided image reading portion in a single-sided image reading mode, and divide the enlarged image in half to generate the pair of divided images.

6. An image forming method comprising:
feeding a recording sheet using a recording sheet supply portion;
forming an image on each of a first recording surface of the recording sheet and a second recording surface opposite the first recording surface, respectively, of the recording sheet, while conveying the recording sheet supplied from the recording sheet supply portion, in a double-sided image forming portion;
acquiring a pair of divided images each constituting a half of an original image using a divided image acquiring portion;
supplying a folded recording sheet that is the recording sheet folded in half to the double-sided image forming portion using an image forming control portion, and causing the double-sided image forming portion to perform processing of forming the pair of divided images on the first recording surface and the second recording surface, respectively, of the folded recording sheet;

selecting one of a first image forming operation mode and a second image forming operation mode, wherein the first image forming operation mode is an operation mode in which the folded recording sheet is supplied to the double-sided image forming portion, the second image forming operation mode is an operation mode in which the recording sheet that is not folded is supplied to the double-sided image forming portion, and the image forming control portion includes a conveyance control portion configured to, when the first image forming operation mode is selected, set a conveyance speed of the recording sheet to a lower speed than when the second image forming operation mode is selected;

detecting an overlapping state of the recording sheet based on levels of detection signals of transmitted waves resulting from ultrasonic waves at two detected portions of the recording sheet, wherein the two detected portions are portions of the recording sheet fed from the recording sheet supply portion that are located at positions close to opposite ends in a width direction orthogonal to a feeding direction of the recording sheet, and one of the detected portions is determined to be a folded-back portion of the folded recording sheet, and wherein the first image forming operation mode is selected when a level of a detection signal of each of the two detected portions that is outputted from the first detecting portion and a level difference between the detection signals of the two detected portions satisfy a predetermined first condition, and the second image forming operation mode is selected when the level of the detection signal of each of the two detected portions that is outputted from the first detecting portion and the level difference between the detection signals of the two detected portions do not satisfy the first condition; and when the first image forming operation mode is selected, causing, by the image forming control portion, the double-sided image forming portion to perform processing of forming the pair of divided images on the folded recording sheet such that edges of the pair of divided images, each forming a dividing line on the original image, extend along a fold line of the folded recording sheet, with the fold line of the folded recording sheet being at one of the opposite ends of the folded recording sheet in the width direction, the one of the opposite ends being determined by a result of a comparison between levels of two detection signals of the two detected portions outputted from the first detecting portion.

7. An image forming method comprising:

feeding a recording sheet using a recording sheet supply portion;

forming an image on each of a first recording surface of the recording sheet and a second recording surface opposite the first recording surface, respectively, of the recording sheet, while conveying the recording sheet supplied from the recording sheet supply portion, using a double-sided image forming portion;

acquiring a pair of divided images each constituting a half of an original image using a divided image acquiring portion, wherein the divided image acquiring portion serves as the double-sided image reading portion when images of a first document surface and a second document surface of a folded document that is a document folded in half are read as the pair of divided images;

supplying a folded recording sheet that is the recording sheet folded in half to the double-sided image forming portion using an image forming control portion, and cause the double-sided image forming portion to perform processing of forming the pair of divided images on the first recording surface and the second recording surface, respectively, of the folded recording sheet;

feeding the document using a document supply portion;

reading an image formed on each of the first document surface of the document and the second document surface opposite the first document surface using a double-sided image reading portion while conveying the document supplied from the document supply portion selecting one of a first image forming operation mode and a second image forming operation mode, the first image forming operation mode being an operation mode in which the folded recording sheet is supplied to the double-sided image forming portion, the second image forming operation mode being an operation mode in which the recording sheet that is not folded is supplied to the double-sided image forming portion;

using a second detecting portion, detecting an overlapping state of the document based on levels of detection signals of transmitted waves resulting from ultrasonic waves at two detected portions of the document fed from the document supply portion that are located at positions close to opposite ends in a width direction orthogonal to a feeding direction of the document;

when the first image forming operation mode is selected in a state in which a level of a detection signal of each of the two detected portions that is outputted from the second detecting portion and a level difference between the detection signals of the two detected portions satisfy a predetermined second condition, storing a position of one of the opposite ends of the document in the width direction, as a position of edges of the pair of divided images, each forming a dividing line on the original image, the one of the opposite ends being determined by a result of a comparison between levels of two detection signals of the two detected portions outputted from the second detecting portion, and causing, by the image forming control portion, the double-sided image forming portion to form, as the pair of divided images, images of the first document surface and the second document surface read by the double-sided image reading portion from the document supplied from the document supply portion; and when the first image forming operation mode is selected, causing, by the image forming control portion, the double-sided image forming portion to perform the processing of forming the pair of divided images on the folded recording sheet such that the edges of the pair of divided images extend along a fold line of the folded recording sheet.

* * * * *